US007789942B2

(12) United States Patent
Vanderstraeten et al.

(10) Patent No.: US 7,789,942 B2
(45) Date of Patent: Sep. 7, 2010

(54) METHOD AND DEVICE FOR DRYING A GAS

(75) Inventors: Bart Etienne Agnes Vanderstraeten, Haacht (BE); Reinoud Luk Herwig Neefs, Lier (BE)

(73) Assignee: ATLAS COPCO AIRPOWER, naamloze vennootschap, Wilrijk (BE)

( * ) Notice: Subject to any disclaimer, the term of this patent is extended or adjusted under 35 U.S.C. 154(b) by 257 days.

(21) Appl. No.: 12/087,245

(22) PCT Filed: Jan. 4, 2007

(86) PCT No.: PCT/BE2007/000002

§ 371 (c)(1),
(2), (4) Date: Jun. 27, 2008

(87) PCT Pub. No.: WO2007/079553

PCT Pub. Date: Jul. 19, 2007

(65) Prior Publication Data

US 2009/0007784 A1   Jan. 8, 2009

(30) Foreign Application Priority Data

Jan. 12, 2006   (BE)   ................... 2006/0025

(51) Int. Cl.
*B01D 53/06* (2006.01)
*B01D 53/26* (2006.01)
(52) U.S. Cl. .................. 95/113; 95/119; 95/122; 96/125; 96/130; 96/380; 55/DIG. 17

(58) Field of Classification Search .............. 95/113, 95/117–119, 121, 122, 148; 96/109, 110, 96/125, 144, 150, 380; 55/DIG. 17; 34/80, 34/329, 330, 473
See application file for complete search history.

(56) References Cited

U.S. PATENT DOCUMENTS

| 3,592,563 | A | * | 7/1971 | Glass et al. | ................. | 417/167 |
| 4,549,888 | A | | 10/1985 | Fannin | | |
| 4,714,483 | A | * | 12/1987 | Koening et al. | ............... | 96/113 |
| 5,145,495 | A | * | 9/1992 | Elamin | ........................ | 96/114 |
| 5,286,283 | A | * | 2/1994 | Goodell | ....................... | 96/113 |
| 5,385,603 | A | | 1/1995 | Sienack | | |
| 6,074,462 | A | * | 6/2000 | Quinn et al. | .................. | 96/113 |
| 6,425,935 | B1 | | 7/2002 | Amato et al. | | |
| 7,326,277 | B1 | * | 2/2008 | Cohen et al. | .................. | 95/113 |
| 7,569,095 | B2 | * | 8/2009 | Vanderstraeten et al. | ...... | 95/107 |
| 7,608,132 | B2 | * | 10/2009 | Fornof et al. | ................... | 95/23 |

FOREIGN PATENT DOCUMENTS

| BE | 1 005 764 A3 | 1/1994 |
| DE | 32 03 152 A1 | 8/1983 |
| WO | WO 2006/012711 A1 | 2/2006 |

* cited by examiner

*Primary Examiner*—Frank M Lawrence
(74) *Attorney, Agent, or Firm*—Bacon & Thomas, PLLC

(57) ABSTRACT

Method for drying gas coming from a compressor (2), which is directed through a drier (5) of the type which consists of an air receiver (6) and a drying element (9) in the form of a rotor in which has been provided an adsorption and/or absorption medium (10) which is alternately guided through a drying zone (7) and a regeneration zone (8) of the air receiver (6), whereby during periods of standstill or of idle running of the compressor (2) a gas flow is guided counterflow through the adsorption and/or absorption medium (10) in the drying zone (7), i.e. in a flow direction (P) from the outlet (22) to the inlet (15) of the drying zone (7).

14 Claims, 2 Drawing Sheets

METHOD AND DEVICE FOR DRYING A GAS

The present invention concerns an improved method for drying a gas, more particularly for drying a gas from a compressor.

It is known to dry compressed gas coming from a compressor by cooling it first and by subsequently guiding it through a drying element with an adsorption and/or absorption medium.

With such a known method, it is also known to alternately put this adsorption and/or absorption medium through what is called a drying zone and what is called a regeneration zone into a drier, whereby the adsorption and/or absorption medium is regenerated in the regeneration zone.

To this end, according to a known method, a part of the gas to be dried is used, which is guided, without cooling it first, over the adsorption and/or absorption medium in the regeneration zone, whereby it absorbs moisture.

A disadvantage of this known method is that the dried gas temporarily has an increased humidity level, i.e. an increased pressure dew point when the compressor is switched on again after a period of standstill or after a period of idle running.

Depending on the field of application of the dried air, upward peaks of the pressure dew point in the user network behind the drier are unacceptable.

This problem with pressure dew point peaks occurs in particular with installations having one drier and one compressor, whereby the compressor is not constantly working at full load and with installations having several compressor/drier combinations connected in parallel and of which at least one compressor is not implemented at full load all the time.

Research has revealed that a temporary increase of the pressure dew point when one or several compressors are switched on again after a period of standstill or of idle running can be explained by the following phenomenon.

When the compressor is working at full load, a state of equilibrium is created so to say between the moisture content on the inlet side and on the outlet side of the drying element, whereby the drying element contains more moisture on the inlet side than on the outlet side.

When the compressor is subsequently switched off or is being driven unloaded, and thus little or no gas flows through the drier, the above-mentioned equilibrium is disturbed and there will be a diffusion of moisture from the damp inlet side to the drier outlet side of the drying element.

Moreover, when the compressor is switched off or is being driven unloaded, the pressure difference between the inlet side of the regeneration zone and the outlet side of the drying zone falls away, and a flow of hot, damp air is created from the regeneration zone to the drying zone.

As a result, the moisture increases on the outlet side of the drying element and even within the dried air available behind the drying element in the user network or in the connection to the user network.

When the compressor is then subsequently switched on again, there will be a temporary increase of the pressure dew point of the dried gas due to the created unbalance, until the equilibrium is recovered after a while.

The aim of the present invention is to remedy the above-mentioned and other disadvantages.

To this end, the invention concerns a method for drying gas coming from a compressor, whereby the gas to be dried is directed through a drier of the type which mainly consists of an air receiver and a drying element in the form of a rotor in which has been provided an adsorption and/or absorption medium which is alternately guided through a drying zone of the air receiver for drying the gas and through a regeneration zone of the air receiver for regenerating the adsorption and/or absorption medium in the regeneration zone, whereby the gas to be dried is guided via an inlet of the drying zone through the adsorption and/or absorption medium in the drying zone to an outlet of the drying zone for feeding a user network connected to this outlet and whereby, during periods of standstill or of idle running of the compressor, a gas flow is guided counterflow through the adsorption and/or absorption medium in the drying zone, i.e. in a flow direction from the outlet to the inlet of the drying zone.

An advantage of the present invention is that by guiding a gas counterflow through the adsorption and/or absorption medium in the drying zones during periods of standstill or of idle running of the compressor, any diffusion of moisture is prevented during this period, and thus is avoided that the already dried gas would absorb moisture behind the drier.

By applying this method, the pressure dew point peaks which would otherwise occur each time the compressor is switched on again after periods of standstill or of idle running are avoided in a simple manner.

Another advantage connected thereto is that the dew point of the dried gas remains practically constant when the compressor is in use, and consequently has few fluctuations.

Preferably, a dried gas is used to be guided counterflow through the adsorption and/or absorption medium in the drying zone.

This offers the additional advantage that the adsorption and/or absorption medium in the drying zone is dried during the periods of standstill or of idle running of the compressor, such that it is even possible that the pressure dew point of the dried gas, immediately after the compressor has been switched on again, is even lower than when the compressor is working under load.

The dry gas, which is guided counterflow through the adsorption and/or absorption medium in the drying zone, is preferably branched off from the above-mentioned user network, for example by simply connecting the drying zone to the atmosphere, as a result of which dried gas from the user network under pressure will automatically flow, over the adsorption and/or absorption medium in the drying zone, to the atmosphere.

The present invention also concerns a device which can be applied with the above-described method according to the invention, which device mainly consists of a drier of the type which consists of an air receiver and a drying element in the form of a rotor in which has been provided an adsorption and/or absorption medium which is alternately guided through a drying zone of the air receiver for drying the gas and through a regeneration zone of the air receiver for regenerating the adsorption and/or absorption medium in the regeneration zone, whereby the drying zone is provided with an inlet and an outlet for the gas and whereby the device is provided with means which make it possible, during periods of standstill or of idle running of the compressor, to guide a gas flow counterflow through the adsorption and/or absorption medium in the drying zone, i.e. in a flow direction from the outlet to the inlet of the drying zone.

In order to better explain the characteristics of the present invention, the following embodiment of a device according to the invention for drying a gas is given as an example only without being limitative in any way, with reference to the accompanying drawings, in which:

FIG. 1 schematically represents a device according to the invention for drying a gas coming from a compressor;

Figure 1:
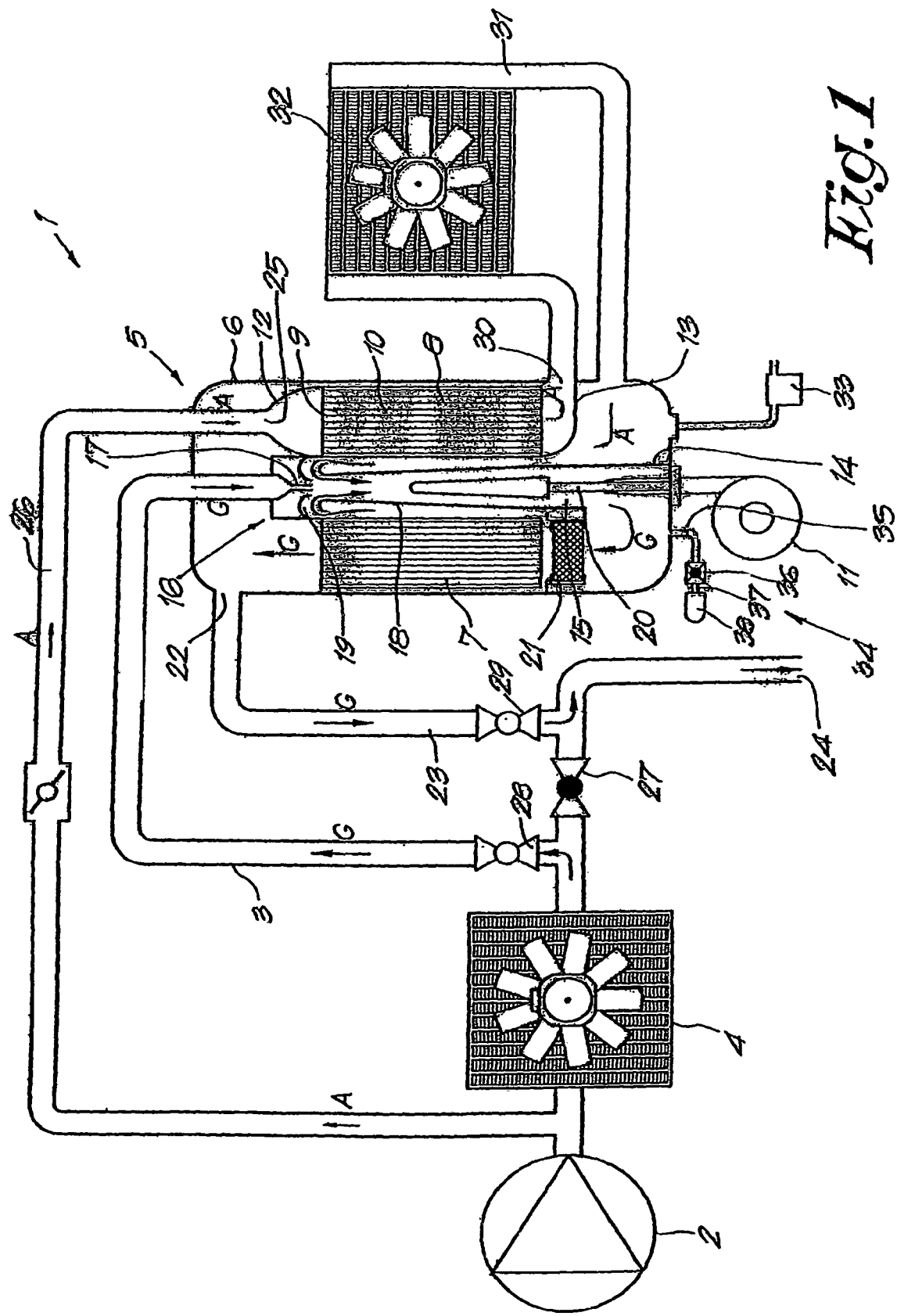
FIG. 1 represents a device 1 according to the invention for drying a gas coming from a compressor 2.

The outlet of the compressor 2 is connected, via a compressed air line 3 and an after-cooler 4 implemented in the latter, to the device 1 which mainly consists of a drier 5 of the type which is described in BE 1,005,764 and which consists of an air receiver 6 which is divided in a drying zone 7 and a regeneration zone 8, with a rotatable drying element 9 which is built of a tubular rotor in which has been provided an adsorption and/or absorption medium which can be flown through, and which is alternately put through the drying zone 7 and the regeneration zone 8 by means of a drive 11.

The regeneration zone 8 is formed of a sector of the drying vessel 6 which is screened off from the drying zone 7 by means of partitions 12, 13, 14.

Between the inlet 15 of the drying zone 7 and the compressed air line 3 is provided a mixing device 16 for gases which has been integrated in the air receiver 6 in this case.

In the given example, this mixing device 16 consists of an ejector which, as is known, contains a jet pipe 17 and a mixing pipe 18, in between which is provided a suction opening 19 for sucking in gas from the regeneration zone 8.

In the described drier 5 from FIG. 1, the mixing device 16 extends axially through the tubular, rotating drying element 9 and it is used as a drive shaft for the drying element 9 in this case, to which end the mixing pipe 18 is connected to the drive 11 by means of a shaft 20.

A liquid separator 21 is optionally provided in the drying zone 7 between the mixing device 16 and the drying element 9.

The outlet 22 of the drying zone 4 is connected to a user network 24 of compressed dried gas via an outlet line 23.

The inlet 25 of the regeneration zone 8 is directly connected to the outlet of the compressor 2 via a branch 26 of the compressed air line 3 in a place between the compressor 2 and the after-cooler 4 so as to be able to guide uncooled compressed gas from the compressor 2 through the regeneration zone 8.

As is customary with this type of driers 2, the compressed air line 3 and the outlet line 23 are mutually connected by means of a bypass in which is provided a bypass valve 27 which is closed during normal use of the device, as is represented in FIG. 1.

Also in the compressed air line 3 and in the outlet line 23 are provided valves 28, 29 respectively which, as represented in FIG. 1, are open when the bypass valve 27 is closed.

The outlet 30 of the regeneration zone 8 is connected to the suction opening 19 of the mixing device 16 via a canalisation 31 and a cooler 32 which is implemented therein.

In the lower point of the above-mentioned canalisation 31 is provided a condensate separator 33.

According to the invention, the device 1 is provided with means 34 which make it possible to guide a gas flow counterflow through the adsorption and/or absorption medium 10 in the drying zone 7 during periods of standstill or of idle running of the compressor 2, i.e. in a direction of flow from the outlet 22 to the inlet 15 of the drying zone 7.

In the case of FIG. 1, the above-mentioned means are formed of a drain opening 35 which can be sealed, provided in the air receiver 6 in a place between the drying element 9 and the inlet 15 of the drying zone 7.

The drain opening 35 can for example be sealed by means of an electro valve 36 which is coupled to a control box which is not represented in the figures, which opens the electro valve 36 as soon as the compressor 2 is switched off or is being driven unloaded.

The drain opening 35 is preferably equipped with a calibrated release valve 37 and a sound absorber 38.

The working of the above-described device according to the invention is simple and as follows.

In case of a normal load of the drier 2, i.e. when the compressor 1 is operational and produces compressed gas, the electro valve 36 is closed.

The compressed gas to be dried is then guided via the compressed air line 3 and the cooler 4 into the drier 5 where the gas, as is represented by the arrows G in FIG. 1, is carried through the mixing device 16 and is subsequently dried by means of the above-mentioned liquid separator 21 and the adsorption and/or absorption medium 10 which absorbs moisture from the gas.

The dried gas is subsequently guided through the outlet line 23 to the user network 24.

In order to be able to regenerate the adsorption and/or absorption medium 10, the drying element 9 is driven by the drive 11 at a low rotational speed, whereby the adsorption and/or absorption medium 10 is alternately put through the drying zone 7 and the regeneration zone 8.

Via the branch 25, a major percentage of the rated compressor flow, for example 35%, is branched off directly from the outlet of the compressor 2, and this uncooled gas flow, as represented by means of the arrows A in FIG. 1, is guided through the adsorption and/or absorption medium 10 in the regeneration zone 8, as a result of which this relatively warm and unsaturated gas absorbs the moisture from the adsorption and/or absorption medium 10.

As it leaves the regeneration zone 8, this gas is first cooled in the cooler 32, before being sucked up through the suction opening 19 in the mixing device 16 so as to be mixed with the gas to be dried coming from the compressed air line 3.

The condensate which is created as a result of the cooling of the gas in the cooler 32 is discharged by the condensate separator 33.

Figure 2:
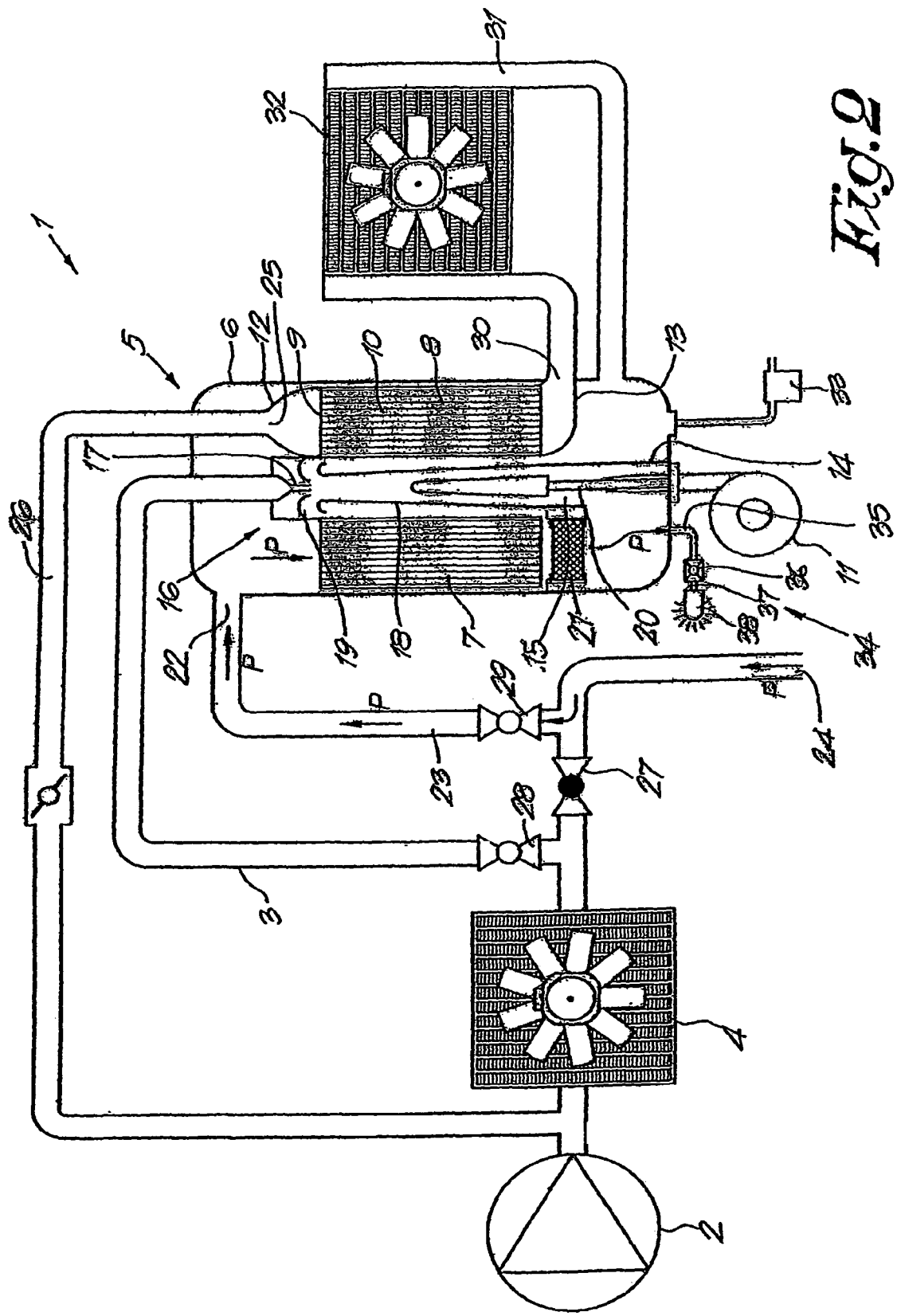
FIG. 2 represents the device from FIG. 1, but during a period of standstill of the compressor.

When the compressor 2 is switched off or is being driven unloaded, as is represented in FIG. 2, the electro valve 36 is opened and the drying zone 7 is connected to the atmosphere.

The compressor 2 has no output at that time, as a result of which there will be no flow from the compressor 2 through the drier 5 either any more.

Due to the pressure difference between the user network 24 and the atmospheric pressure at the drain opening 35, a gas flow of dried gas is automatically created, as is represented by means of the arrows P in FIG. 2, from the user network counterflow through the absorption medium 10 in the drying zone 7 and via the drain opening 35 to the outside air.

In this manner is prevented that, during this period of standstill or of idle running of the compressor 2, moisture would diffuse from the inlet side of the drying zone 7 to the outlet side of the drying zone 7 and that the dried gas behind the drying element 9 would become damp as a result thereof, which would result in a sudden increase of the pressure dew point of the dried gas when the compressor 2 is switched on again.

The desired gas flow which flows counterflow through the absorption medium 10 in the drying zone 7 is determined by an appropriate selection of the release valve and it amounts to for example 2% of the rated compressor flow.

It is clear that, in the preferred example, the means 34 for directing a gas counterflow through the drying element 7 during periods of standstill or of idle running of the compressor 2 are realised in a very simple manner by merely providing a drain opening 35 on a conventional drier of the above-described type, i.e. without any additional pipes and/or branches or any other provisions.

Naturally, it is also possible to realise the above-mentioned means in other ways.

The rinsing gas which is directed counterflow through the drying element during periods of standstill or of idle running of the compressor preferably flows through the drying element over its entire length in the axial direction. However, it is not excluded for this rinsing gas to flow only through a part of this length.

The drain opening 35 to the atmosphere can be provided in different places so as to create a gas flow from the user network over the drying element. Thus, the drain opening can also be provided for example in the compressed air line 3 or in the canalisation 31.

The above-described invention is by no means restricted to the above-described embodiments represented in the accompanying drawings; on the contrary, it can be realised according to different variants while still remaining within the scope of the invention.

The invention claimed is:

1. Method for drying gas discharged from a compressor, comprising: directing the gas to be dried through a drier of the type which comprises an air receiver and a drying element in the form of a rotor in which has been provided either or both an adsorption and absorption medium which is alternately guided through a drying zone of the air receiver for drying the gas and through a regeneration zone of the air receiver for regenerating either or both the adsorption and absorption medium in the regeneration zone; guiding said gas to be dried via an inlet of the drying zone through either or both the adsorption and absorption medium in the drying zone to an outlet of the drying zone arranged to feed a user network connected to the outlet; wherein, during periods of standstill or of idle running of the compressor, a gas flow is guided counterflow through either or both the adsorption and absorption medium in the drying zone, in a flow direction from the outlet to the inlet of the drying zone.

2. Method according to claim 1, wherein the gas which is guided counterflow through either or both the adsorption and absorption medium in the drying zone is a dry gas.

3. Method according to claim 1, wherein the gas which is guided counterflow through either or both the adsorption and absorption medium in the drying zone is branched off from the user network.

4. Method according to claim 3, wherein the gas flow which is branched off from the user network, is obtained by connecting the drying zone to the atmosphere.

5. Method according to claim 4, wherein the gas flow which is branched off from the user network is obtained by connecting a space of the drying zone between the drying element and the inlet of the drying zone to the atmosphere.

6. Method according to claim 4, wherein the drying zone is connected to the atmosphere via a sealable drain opening in the air receiver.

7. Method according to claim 6, wherein the sealable drain opening is controlled by a control box which opens the drain opening as soon as the compressor is switched off or is being driven unloaded.

8. Device for drying a gas discharged from a compressor, comprising a drier including an air receiver and a drying element in the form of a rotor in which has been provided either or both an adsorption and absorption medium which is alternately guided through a drying zone of the air receiver for drying the gas and through a regeneration zone of the air receiver for regenerating either or both the adsorption and absorption medium in the regeneration zone, said drying zone including an inlet and an outlet for the gas; means enabling, during periods of standstill or of idle running of the compressor, guidance of a gas flow counterflow through either or both the adsorption and absorption medium in the drying zone, in a flow direction from the outlet to the inlet of the drying zone.

9. Device according to claim 8, wherein said means comprises a sealable drain opening in the air receiver which, when opened, connects the user network over the drying element to the atmosphere.

10. Device according to claim 8, wherein the drain opening is provided in the air receiver in a place between the drying element and the inlet of the drying zone.

11. Device according to claim 9, wherein the drain opening is sealable by an electro valve.

12. Device according to claim 11, including a control box which opens the electro valve as soon as the compressor is switched off or is being driven unloaded.

13. Device according to claim 9, wherein the drain opening is provided with a calibrated release valve.

14. Device according to claim 9, wherein the drain opening is provided with a sound absorber.

* * * * *